United States Patent
Flynn et al.

(10) Patent No.: US 7,234,310 B2
(45) Date of Patent: Jun. 26, 2007

(54) VERY LOW TEMPERATURE REFRIGERATION SYSTEM HAVING A SCROLL COMPRESSOR WITH LIQUID INJECTION

(75) Inventors: Kevin P. Flynn, Novato, CA (US); Oleg Podtcherniaev, Moscow (RU)

(73) Assignee: Brooks Automation, Inc., Chelmsford, MA (US)

( * ) Notice: Subject to any disclaimer, the term of this patent is extended or adjusted under 35 U.S.C. 154(b) by 179 days.

(21) Appl. No.: 11/081,003

(22) Filed: Mar. 15, 2005

(65) Prior Publication Data

US 2007/0000261 A1  Jan. 4, 2007

Related U.S. Application Data

(63) Continuation of application No. PCT/US03/29211, filed on Sep. 18, 2003.

(60) Provisional application No. 60/411,676, filed on Sep. 18, 2002.

(51) Int. Cl.
C09K 5/04 (2006.01)
(52) U.S. Cl. ............................................. 62/114
(58) Field of Classification Search .............. 62/114, 62/277, 469; 252/67; 417/312; 418/210
See application file for complete search history.

(56) References Cited

U.S. PATENT DOCUMENTS

| 5,076,067 | A | 12/1991 | Prenger et al. |
|---|---|---|---|
| 5,640,854 | A | 6/1997 | Fogt et al. |
| 5,685,163 | A | 11/1997 | Fujita et al. |
| 5,741,120 | A * | 4/1998 | Bass et al. ............ 417/44.2 |
| 5,910,161 | A | 6/1999 | Fujita et al. |
| 6,006,542 | A | 12/1999 | Tojo et al. |
| 6,017,205 | A | 1/2000 | Weatherston et al. |
| 6,055,827 | A | 5/2000 | Tojo et al. |
| 6,070,420 | A * | 6/2000 | Biancardi et al. ......... 62/114 |
| 6,073,454 | A | 6/2000 | Spauschus et al. |
| 6,098,421 | A | 8/2000 | Fujita et al. |
| 6,206,652 | B1 | 3/2001 | Caillat |
| 6,481,223 | B2 | 11/2002 | Flynn et al. |
| 6,502,410 | B2 | 1/2003 | Podtchereniaev et al. |
| 6,574,978 | B2 | 6/2003 | Flynn et al. |

OTHER PUBLICATIONS

International Search Report dated Aug. 20, 2004.
International Preliminary Examination Report.
Lehman, R., "A mechanically refrigerated cryogenic freezer for air-phase storage of biologicals at -150° C without liquid nitrogen," American Laboratory, pp. 25-31 (Oct. 1996).
Podtcherviaev, O., et al., "Performance of Throttle-Cycle Coolers Operating With Mixed Refrigerants Designed For Industrial Applications In a Temperature Range 110 To 190 K," CP613, Adv. In Cryongenic Eng., 47: 863-872.

* cited by examiner

*Primary Examiner*—Melvin Jones
(74) *Attorney, Agent, or Firm*—Hamilton, Brook, Smith & Reynolds, P.C.

(57) ABSTRACT

Disclosed is a very low temperature or cryogenic refrigeration system with a scroll compressor and utilizing a mixed refrigerant that decreases refrigerant discharge temperature by refrigerant injection into the compressor.

21 Claims, 3 Drawing Sheets

VERY LOW TEMPERATURE REFRIGERATION SYSTEM HAVING A SCROLL COMPRESSOR WITH LIQUID INJECTION

CROSS-REFERENCE TO RELATED APPLICATION

This application is a continuation application of International Application PCT/US2003/029211 filed Sep. 18, 2003, now International Publication WO 2004/027324 and claims the benefit of U.S. Provisional application No. 60/411,676 filed Sep. 18, 2002, the contents of which are herein wholly incorporated by reference.

BACKGROUND OF THE INVENTION

Refrigeration systems have been in existence since the early 1900s, when reliable sealed refrigeration systems were developed. Since that time, improvements in refrigeration technology have proven their utility in both residential and industrial settings. In particular, very low temperature refrigeration systems currently provide essential industrial functions in biomedical applications, cryoelectronics, optical coating operations, industrial and commercial coating operations, and semiconductor manufacturing applications. Refrigeration systems manufacturers are also faced with increasingly restrictive environmental regulations that have driven the refrigeration industry away from chlorinated fluorocarbons (CFCs) to hydrochlorinated fluorocarbons (HCFCs), and more recently, to hydrofluorocarbons (HFCs) due to a European Union law (in effect January 2001) banning use of HCFCs.

System floor space is yet another consideration for the refrigeration industry. The semiconductor industry, for example, is very concerned about reducing the overall system footprint. As a result, refrigeration systems manufacturers continue to develop refrigeration systems that use compact components without sacrificing performance and capacity.

Where horizontal floor space is more limited than vertical space, it is beneficial to use the available vertical space if possible. As an example, reciprocating and screw compressors are typically designed horizontally. Semi-hermetic reciprocating compressors are particularly large, adding to the required floor space of a refrigeration system. By contrast, efficient, high capacity scroll compressors are designed vertically, thereby taking advantage of available vertical space and reducing the size of the overall system footprint.

Other fields of application are in the biological storage, and pharmaceutical and chemical processing. Very low temperature mixed refrigerant systems have been used in biological freezers and can be used in processing of pharmaceutical products and chemicals for the purpose of controlling process reactions or to otherwise control these processes. Other applications include freeze-drying of pharmaceutical and biological agents, reagents and other substances, and freeze drying of food products.

The concept of a scroll compressor is about 100 years old. However, only in the last 20-30 years have the required machining tolerances been achievable to make this design achievable on a commercial scale. Beginning in the late 1980's and early 1990's scroll compressors began to be commercialized, mainly for residential and commercial air conditioning applications. By the mid 1990's refrigeration scrolls began to be used for commercial refrigeration applications (i.e. supermarket refrigeration).

These modern scroll compressors feature a vertical design in which the motor shaft is vertical, and the motor is in the lower part of the compressor housing and extends down to the compressor oil sump. The scrolls sit above the motor. The orbiting scroll is moved by the motor shaft, while the stationary scroll is held in place above the orbiting scroll.

The typical reciprocating compressor discharge temperature in very low temperature refrigeration systems is in the range of 110 to 130° C. 130° C. is typically a maximum allowable discharge temperature (as measured at the compressor service valve). Steady state operation will typically be limited temperatures lower than 130° C. Temperatures in excess of 130° C. result in decomposition of the compressor oil and subsequent metal wear which results in a compressor failure.

Scroll compressors tend to have higher compressor discharge temperatures. To remain competitive with alternate compressors liquid injection was developed for the refrigeration scrolls to manage compressor discharge temperature and improve refrigeration capacity.

In a typical unit, the discharge temperature of a scroll compressor imposes a significant limitation on the operating conditions of the compressor and reduces overall system efficiency. Some influencing factors are the composition of the overall mixture, and the compressor discharge and suction pressures. Therefore, it is desirable to find a means to lower the discharge temperature for a given refrigerant system to enable operation at a lower evaporator temperature or with greater refrigeration capacity at a given evaporator temperature.

Stated another way, it is desirable to maintain the discharge temperature in a safe range while optimizing the overall system performance to achieve greater overall efficiency. For purposes of reference, efficiency can be compared against Carnot efficiency. See for example "Performance of Throttle-Cycle Coolers Operating With Mixed Refrigerants Designed for Industrial Applications in a Temperature Range 110 to 190 K", by Podtcherniaev, Boiarski and Flynn, published in Advances in Cryogenic Engineering: Proceedings of the Cryogenic Engineering Conference, Vol 47 (2002).

One known method of cooling the compressed gas is to inject liquid refrigerant from the condenser through an injection passage directly into the compressor. The liquid refrigerant may be injected into the suction gas area of the compressor or it may be injected into the intermediate enclosed space defined by the scroll members (see for example U.S. Pat. No. 5,640,854 and U.S. Pat. No. 5,076,067).

The evolution of refrigerant use has changed the design and function of refrigeration systems. Traditionally, an alkylbenzene compressor oil, or mineral oil, was used with CFC and HCFC systems. However, HFCs are much less miscible and are considered to be immiscible in alkylbenzene oil, so a polyolester (POE) compressor oil is typically used to be miscible with the HFC refrigerants. Refrigeration systems manufacturers must comply with the current environmental laws dictating refrigerant selection and must also provide ways to cope with the impact that the refrigerant component selection has on refrigerant related components, such as compressors, and the compressor oil.

Currently major manufacturers of the scroll compressors such as Copeland, and others, have selected, tested and approved POE oils, which are compatible with conventional refrigerants such as R134a, R404A, and R507. These oils demonstrate good miscibility properties with these refrigerants at temperatures above −45° C. (−49° F.). Oil ejected from the compressor into the discharge line returns back to the compressor carried by the refrigerant, so commercial refrigeration systems don't require oil separators.

What is needed is a refrigeration system with a compressor that is compatible with certain POE oils, which are miscible with refrigerants below −45° C. (−49° F.).

Several attempts have been made to develop an efficient, compact refrigeration system that is compatible with modern refrigerants.

U.S. Pat. No. 6,098,421, Fujita, et al., Aug. 8, 2000, entitled "Refrigerating apparatus," discloses a liquid injection type scroll compressor used in a refrigerating apparatus using hydrofluorocarbon refrigerant which does not contain chlorine (HFC-125/HFC-143a/HFC-134a) as an operating fluid and an amount of an injected liquid is controlled according to a discharge temperature of the compressor. Further, ester oil and/or ether oil is used as refrigerator oil and a dryer is disposed in a refrigerating cycle. With this arrangement, a refrigerating cycle operation can be stably realized in a wide range without always changing the arrangement of a conventional refrigerating apparatus.

U.S. Pat. No. 6,073,454, Spauschus et al., Jun. 13, 2000, entitled "Reduced pressure carbon dioxide-based refrigeration system," discloses a novel refrigeration apparatus and a method of refrigeration. The novel refrigeration apparatus comprises a desorber/evaporator, a scroll compressor operatively connected to said desorber/evaporator, a resorber/condenser operatively connected to said compressor, an expansion device operatively connected to said resorber/condenser and to said desorber/evaporator and a circulating refrigerant comprising carbon dioxide and a liquid co-fluid in which the carbon dioxide is differentially soluble. The refrigeration method comprises compressing carbon dioxide gas and a liquid co-fluid in a scroll compressor to an increased pressure, such that carbon dioxide at least partially dissolves in the liquid co-fluid, and reducing the pressure on the liquid co-fluid containing the dissolved carbon dioxide so that dissolved carbon dioxide comes out of solution with the liquid co-fluid, and recirculating the gaseous carbon dioxide and liquid co-fluid to the scroll compressor.

U.S. Pat. No. 6,055,827, Tojo, et al., May 2, 2000, entitled "Refrigerant compressor and refrigerating apparatus," discloses a refrigerating apparatus with a scroll compressor having a compressing section sucking and compressing a hydrofluorocarbon-based refrigerant, a condenser and the like, in which a plain bearing slidably supporting a driving shaft driving the compressing section of the scroll compressor is made of a material containing lead, and an ether oil miscible with the refrigerant used in a refrigerant circuit is used as a lubricant for lubricating the plain bearing.

U.S. Pat. No. 6,006,542, Tojo et al., Dec. 28, 1999, entitled "Refrigerant compressor and refrigerating apparatus," discloses a refrigerating apparatus with a scroll compressor having a compressing section sucking and compressing a hydrofluorocarbon-based refrigerant, a condenser and the like, in which a plain bearing slidably supporting a driving shaft driving the compressing section of the scroll compressor is made of a material containing lead, and an ether oil miscible with the refrigerant used in a refrigerant circuit is used as a lubricant for lubricating the plain bearing.

U.S. Pat. No. 5,910,161, Fujita, et al., Jun. 8, 1999, entitled "Refrigerating apparatus," discloses a liquid injection type scroll compressor that is used in a refrigerating apparatus using hydrofluorocarbon refrigerant which does not contain chlorine (HFC-125/HFC-143a/HFC-134a) as an operating fluid and an amount of an injected liquid is controlled according to a discharge temperature of the compressor. Further, ester oil and/or ether oil is used as refrigerator oil and a dryer is disposed in a refrigerating cycle. With this arrangement, a refrigerating cycle operation can be stably realized in a wide range without almost changing the arrangement of a conventional refrigerating apparatus.

U.S. Pat. No. 5,685,163, Fujita et al., Nov. 11, 1997, entitled "Refrigerating apparatus," discloses a liquid injection type scroll compressor that is used in a refrigerating apparatus using hydrofluorocarbon refrigerant which does not contain chlorine (HFC-125/HFC-143a/HFC-134a) as an operating fluid and an amount of an injected liquid is controlled according to a discharge temperature of the compressor. Further, ester oil is used as refrigerator oil and a dryer is disposed in a refrigerating cycle. With this arrangement, a refrigerating cycle operation can be stably realized in a wide range without almost changing the arrangement of a conventional refrigerating apparatus.

Telemark Cryogenics (Northampton, UK) manufactures a very low temperature refrigeration system that uses a refrigeration scroll compressor. Some of these systems use scrolls equipped for use with liquid injection, but this feature is not used. Unfortunately, this system does not have a desirably high efficiency.

An additional reference describing a scroll compressor in an auto-cascade refrigeration system is an article in the October 1996 issue of *American Laboratory*, entitled "A mechanically refrigerated cryogenic freezer for air-phase storage of biologicals at −150° C. without liquid nitrogen," by Robert D. Lehman. This article refers to an air conditioning scroll compressor without liquid injection. Unfortunately, this system does not have a desirably high efficiency.

It is an object of this invention to provide a very low temperature or cryogenic refrigeration system with improved efficiency and decreased size, which complies with current environmental laws dictating refrigerant selection.

It is a further object of this invention to provide a highly efficient, high capacity, compact compressor that allows a reduced refrigeration system footprint.

It is a further object of this invention to provide a refrigeration system with a scroll compressor that manages the refrigerant discharge temperature.

SUMMARY OF THE INVENTION

The embodiments disclosed herein are intended for systems providing refrigeration at temperatures ranging from −60° C. to −208° C. and employing a mixture comprised of at least two refrigerants whose normal boiling points (e.g. boiling temperature of the pure component at one standard atmosphere) differ by at least 50° C. For purposes of this disclosure, very low temperature refers to the temperature range of −60° C. to −208° C.

Throughout this disclosure, reference is made to refrigerants via "R" numbers. These designations are as defined by ASHRAE standard # 34. ASHRAE stands for the American Refrigeration Society of Heating, Refrigeration and Air Conditioning Engineers. Other refrigerants are referred to by their common names such as argon (Ar), nitrogen ($N_2$), and ethane ($C_2H_6$).

For purposes of this disclosure, it is important to segregate the various refrigerants based on their normal boiling temperature. Refrigerants with boiling points warmer than −15° C. are referred to as warm boiling refrigerants. This group includes but is not limited to refrigerants such as R-124, R-236fa, R-245fa, R-123, etc. Refrigerants with boiling points between −15° C. and −60° C. are referred to as medium boiling refrigerants. This group includes but is not limited to the regular commercial refrigerants such as R-134a, R-125, R-22, R-32, R-410A, R-404A, propane, etc. Refrigerants with boiling points colder than −60° C. are referred to as low boiling refrigerants. This includes but is not limited to R-23, R-14, ethane, methane, xenon, krypton, argon, helium, neon, nitrogen, oxygen, hydrogen, etc.

In particular, the embodiments disclosed herein are considered most advantageous when used with mixtures comprised of a least one warm boiling refrigerant and one low boiling refrigerant.

The present invention represents an increased efficiency modification of prior art systems, providing improved efficiency. A significant difference between the presently disclosed systems and the prior art is that the present systems use a scroll compressor with liquid injection for cooling in a very low temperature refrigeration system with a mixed refrigerant having a high content of low boiling point refrigerants. The low boiling point refrigerant can comprise from about fifteen percent to over fifty percent of the refrigerant mixture, preferably less than fifty percent and most preferably in the range of from about 20 to about 45% of the refrigerant mixture.

This effect is achieved through the following mechanisms:

Room temperature liquid will cool due to a throttling effect when reduced to the intermediate injection temperature. The intermediate compressed gas in the compressor will be at a temperature higher than ambient due to the compression work performed to this point. When mixed with the intermediate pressure liquid, the liquid will evaporate and cool the gas. As a result of this mixing the discharge temperature will be lower since the intermediate stage gas temperature has been lowered;

The addition of these liquids which are of a different composition than the intermediate pressure gas typically have higher molecular weight compounds and typically correspond with lower ratios of specific heat. As a result, in the change in the overall composition and the lowering of the ratio of specific heats of these two mixed streams, the discharge temperature will be lowered;

The addition of refrigerant to the compression process after the two scrolls have enclosed a gas pocket at suction pressure enables a higher refrigerant mass flow rate. Increasing the mass flow rate results in greater refrigeration efficiency.

Managing the presence of warm boiling liquid refrigerants such that they do not adversely separate from the mixture and accumulate in the compressor sump allows higher concentrations of these refrigerants than could be supported with scroll compressors without liquid injection. This improves overall refrigeration efficiency through several means such as increased heat rejection, and/or the ability to use higher concentrations of low boiling components, or the ability to operate over higher compression ratios.

The disclosed systems include a highly efficient, high capacity, compact scroll compressor that manages the discharge temperature of the mixed refrigerant containing low boiling refrigerants. An advantage of the disclosed system is that the circulation of warm boiling refrigerant components is managed such that excess amounts do not accumulate in the compressor oil sump while the compressor is operating. This improved management results in lower compressor discharge temperatures and makes possible improved overall system efficiency.

Further, it provides a refrigeration system with a compressor that is compatible with special low temperature POE oil.

The presently disclosed embodiments provide a refrigeration system with all these benefits while at the same time requiring reduced overall floor space.

These embodiments yield these and other benefits by providing an very low temperature refrigeration system using a commercially manufactured scroll compressor having liquid injection for lowering the discharge temperature that includes:

a scroll compressor with a liquid injection port that further includes;
    a solenoid valve (optional);
    a special FMD;
    a crankcase or band heater (optional);
a discharge line;
a condenser;
a liquid accumulating tank (optional);
a liquid line;
a refrigeration process;
a refrigerant supply line;
an evaporator coil;
a refrigerant return line;
at least one flow metering device in the refrigeration process;
a plurality of service valves (all optional);
a plurality of solenoid valves (all optional);
a compressor suction line;
an expansion tank (optional);
an oil separator having an oil return line (optional);
a defrost line (optional); and
a liquid injection line.

where the scroll compressor feeds the condenser via the discharge line. The condenser removes heat from the refrigerant and feeds a supply inlet of the refrigeration process via the liquid line. The liquid line feeds high-pressure refrigerant to the refrigeration process. A supply outlet of the refrigeration process feeds an inlet of the customer installed evaporator coil via the refrigerant supply line. Inline in the refrigerant supply line between the refrigeration process and the evaporator coil is the first flow-metering device (FMD) feeding the first solenoid valve. An outlet of the evaporator coil feeds the refrigerant return line, which feeds the low-pressure side of the refrigeration process. A return outlet of the refrigeration process closes the loop back to the scroll compressor via the compressor suction line.

The optional expansion tank connects to the compressor suction line. The second optional FMD is arranged inline between an inlet of the expansion tank and the compressor suction line. The defrost supply loop within the refrigeration system is formed as follows: An inlet of the optional oil separator is fed by the discharge line at a node between the scroll compressor and the condenser. A first outlet of the oil separator feeds an inlet of the optional second solenoid valve that feeds the refrigerant supply line at a node between the first solenoid valve and the evaporator coil via the defrost line. Thus, a refrigerant bypass around the refrigeration process is formed that allows hot discharge gas to be fed to the evaporator for purposes of warming. Still other variations of this defrost process are possible. These are described by U.S. Pat. No. 6,574,978, the disclosure of which is incorporated in this application by reference.

A second outlet of the oil separator feeds back to the compressor suction line at a node between the refrigeration process and the scroll compressor via the oil return line An outlet of the condenser feeds both a refrigerant supply (liquid) line and a liquid injection line. The liquid injection line feeds back to the scroll compressor. Inline in the liquid injection line between the liquid line and the scroll compressor are a liquid accumulating tank (optional, not shown), an optional solenoid valve and the third FMD.

The oil sump heater or crankcase heater is a standard component on refrigeration systems and serves the purpose of preventing refrigerant from flooding the compressor during startup. In this application, it is intended that the crankcase heater be optional. However, if used, it can be used in two ways. The first method is to energize this heater only when the compressor is off for the purpose of minimizing refrigerant liquids in the compressor sump. However, on mixed refrigerant systems for very low application, this is typically not very effective since the typical temperatures achieved by these heaters do not effectively reduce such liquid refrigerants due to their very low vapor pressures and corresponding warm normal boiling points.

In some cases, it is beneficial to add a supplemental heater wrap to the outside of the compressor oil sump to provide sufficient energy to control the liquid content in the oil sump. A second method is to energize this heater when the compressor is in operation to reduce the refrigerant liquid content in the oil sump. In an alternative arrangement, high temperature discharge gas is brought into thermal contact with the compressor sump for purposes of warming the oil in the sump, instead of using an external heater, while the compressor is in operation.

In a preferred embodiment, the present system is an very low temperature refrigeration system that uses a scroll compressor having liquid injection for lowering the discharge temperature and an optional heater for oil sump warming that improves the overall system efficiency compared to scroll compressors without liquid injection while minimizing the size of the system as compared with refrigeration systems using conventional reciprocating compressors.

The disclosed very low temperature refrigeration system is suitable for use with mixed refrigerant (MR) blends having warm and low boiling components and is also suitable for use with special low temperature POE oils, and other POE oils, and other conventional compressor oils

DESCRIPTION OF THE INVENTION

The present invention is an very low temperature refrigeration system using a commercially manufactured scroll compressor having liquid injection for lowering the discharge temperature and an optional heater for oil sump warming. Management of discharge temperature is achieved by managing the circulation of warm boiling refrigerants and allows for improved overall system efficiency. The use of a scroll compressor provides compact size of the very low temperature refrigeration system as compared with refrigeration systems using conventional semi-hermetic reciprocating compressors. Furthermore, the very low temperature refrigeration system of the present invention uses a commercially manufactured scroll compressor and is suitable for use with optimized refrigerant (MR) blends having warm and low boiling components.

It uses a commercially manufactured scroll compressor having liquid injection for lowering the discharge temperature and a heater for oil sump warming that includes:
    a scroll compressor with a liquid injection port that further includes;
        a solenoid valve; and
    a special FMD; and
        an optional crankcase or band heater.
    a discharge line;
    a condenser;
    a liquid accumulating tank (optional);
    a liquid line;
    a refrigeration process;
    a refrigerant supply line;
    an evaporator coil;
    a refrigerant return line;
    at least one flow metering devices;
    a plurality of service valves (all optional);
    a plurality of solenoid valves (all optional);
    a compressor suction line;
    an optional expansion tank;
    an oil separator having an oil return line;
    an optional defrost line; and
    a liquid injection line.

Figure 1:
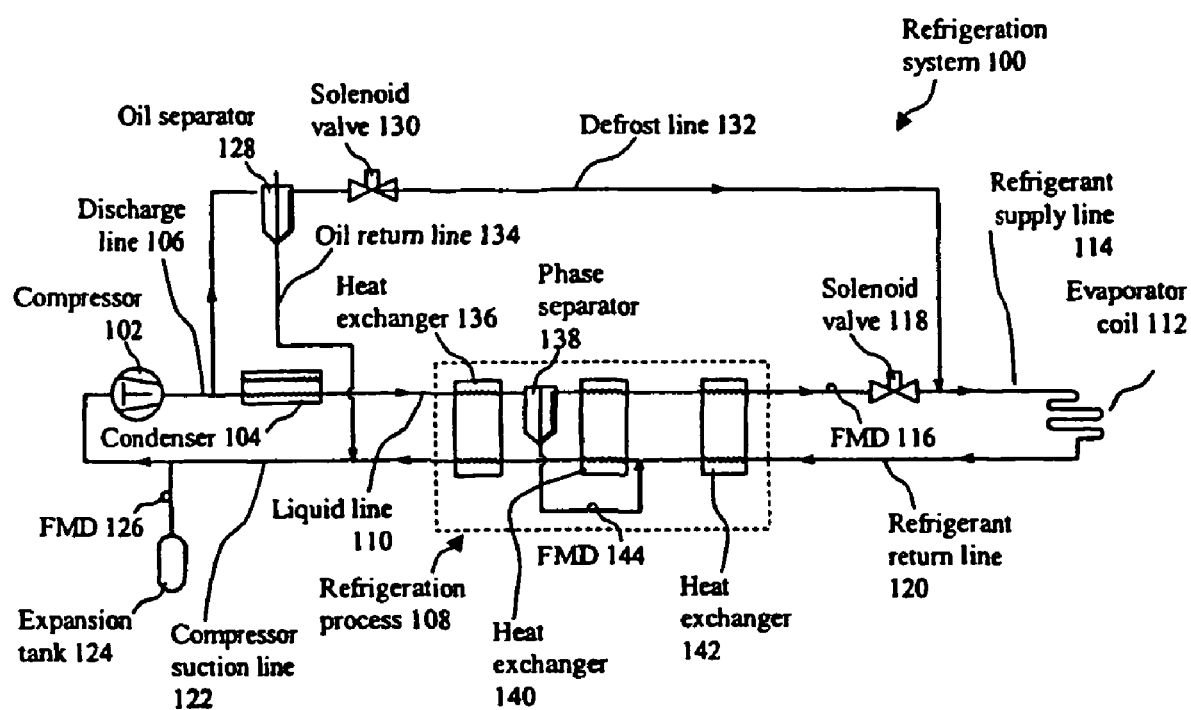
FIG. 1 depicts a prior art very low temperature refrigeration system. In this depiction a very low temperature mixed refrigeration process is shown.

Various embodiments of the refrigeration system are further described by reference to the figures FIG. 1 shows a prior art very low temperature refrigeration system 100. Refrigeration system 100 is an efficient very low temperature refrigeration system with a defrost function. Refrigeration system 100 includes a compressor 102 feeding a condenser 104 via a discharge line 106. Condenser 104 feeds a supply inlet of a refrigeration process 108 via a liquid line 110. A supply outlet of a refrigeration process 108 feeds an inlet of a customer-installed evaporator coil 112 via a refrigerant supply line 114. Inline in refrigerant supply line 114 between refrigeration process 108 and evaporator coil 112 is a flow-metering device (FMD) 116 feeding an optional solenoid valve 118. An outlet of evaporator coil 112 feeds a return inlet of refrigeration process 108 via a refrigerant return line 120. A return outlet of refrigeration process 108 closes the loop back to compressor 102 via a compressor suction line 122. Typically, refrigerant lines 114 and 120, and evaporator 112 are installed by the customer during field installation. In alternative arrangements these elements are integrated into a single packaged unit.

A defrost supply loop within refrigeration system 100 is formed as follows: An inlet of an optional oil separator 128 is fed by discharge line 106 at a node between compressor 102 and condenser 104. A first outlet of oil separator 128 feeds an inlet of an optional solenoid valve 130 that feeds refrigerant supply line 114 at a node between solenoid valve 118 and evaporator coil 112 via a defrost line 132. A second outlet of oil separator 128 feeds back to compressor suction line 122 at a node between refrigeration process 108 and compressor 102 via an oil return line 134. Oil separator 128 is optional and its need is driven by the overall system design. In alternative arrangements the oil separator is used to treat the entire flow exiting the compressor. In yet other alternative arrangements it is omitted entirely. The primary concern is to limit the concentration of oil in the refrigeration system and maintain it in solution with the liquid refrigerant phase.

Refrigeration system 100 further includes an optional expansion tank 124 connected to compressor suction line 122. An FMD 126 is arranged inline between the inlet of expansion tank 124 and compressor suction line 122. The expansion tank 124 and associated FMD 126 are optional depending on the overall system design. Those skilled in the art understand the tradeoffs of having or omitting an expansion tank from the system.

Refrigeration process 108 includes a heat exchanger 136, a phase separator 138, a heat exchanger 140, a heat exchanger 142, and an FMD 144.

The supply refrigerant flow path through refrigeration process 108 is as follows: a supply inlet of heat exchanger 136 is fed by liquid line 110 and a supply outlet of heat exchanger 136 feeds a supply inlet of phase separator 138. A supply outlet of phase separator 138 feeds a supply inlet of heat exchanger 140 and a supply outlet of heat exchanger 140 feeds a supply inlet of heat exchanger 142. A supply outlet of heat exchanger 142 feeds refrigerant supply line 114.

The return refrigerant flow path through refrigeration process 108 is as follows: a return inlet of heat exchanger 142 is fed by refrigerant return line 120 and a return outlet of heat exchanger 142 feeds a return inlet of heat exchanger 140. A return outlet of heat exchanger 140 feeds a return inlet of heat exchanger 136. A return outlet of heat exchanger 136 feeds compressor suction line 122. Additionally, a second outlet of phase separator 138 feeds into FMD 144 and the outlet of the FMD feeds to the refrigerant return path at a node between heat exchanger 140 and heat exchanger 142.

The particular arrangement shown for refrigeration process 108 is one possible arrangement. Many alternative arrangements are possible. As an example, many variations in the number of heat exchangers and phase separators, and their relationships with each other, are possible. In some cases no phase separators are required at all. The main requirement is that the refrigeration process supports the production of refrigeration capacity (heat removal at the evaporator) in the very low temperature range. U.S. Pat. No. 6,502,410, the disclosure of which is incorporated herein by reference, describes various arrangements in greater detail.

In another arrangement, refrigeration process 108 provides a means to remove heat from a secondary fluid such as a gas or liquid (i.e. nitrogen, air, or a liquid heat transfer agent such as Galden HT-70) by exchanging heat at one or more temperatures. Due to the wide range of temperatures possible, it is possible to effectively remove heat from a secondary fluid at more than one temperature. In some arrangements the entire secondary fluid is in heat exchange with the low pressure refrigerant from the coldest temperature to the warmest temperature. In yet other arrangements, this heat removal could be used to liquefy a gas. Further, removal of heat from a secondary fluid to cool and/or liquefy occurs due to heat exchange with evaporator 112.

The interconnection of all elements of refrigeration system 100 as described above is accomplished hydraulically.

The schematic in FIG. 1 shows refrigeration system 100 associating with a single evaporator. In general, the refrigeration system can cool multiple evaporators arranged in parallel or series or a combination of parallel and series arranged evaporators.

The refrigeration system in FIG. 1 shows a single compressor. In general, more than one compressor may be used. These compressors may be arranged in series to further break the compression process into stages. When in series, liquid injection is used in at least one of the compressors. Alternatively, the compressors could be arranged in parallel to economize the compression process based on the demand for cooling. When in parallel, liquid injection is used in at least one of the compressors.

In yet another embodiment, the refrigeration system is arranged in a cascade arrangement consisting of at least two refrigeration systems, operating at different temperatures, where the warmer temperature refrigeration process receives heat from the lower temperature refrigeration process. This embodiment covers such cascade arrangements for the warmer temperature stage provided that the refrigerant is a mixture comprised of two components whose normal boiling points differ by at least 50 degrees C., and the overall effect of the combined refrigeration stages provides a refrigeration effect in the very low temperature range.

The scroll compressor described in FIGS. 2A, 2B, and 2C functions suitably as compressor 102 of refrigeration system 100 of FIG. 1. Additionally, the use of the scroll compressor described in FIGS. 2A, 2B, and 2C further optimizes the efficient operation and compact size of very low temperature refrigeration system 100 and is suitable for use with the nonflammable, chlorine-free, nontoxic, MR blends.

It is not uncommon that a scroll compressor will draw more current, and therefore more electrical power to compress a given refrigerant for a given flow rate, suction pressure and discharge pressure when compared with other compressors, such as a reciprocating compressors. The benefit of the scroll is its reduced horizontal footprint compared with semi hermetic compressors. This invention describes a method to improve the efficiency of a scroll compressor by improved management of the compressor discharge temperature, thus allowing the refrigeration system designer to minimize limitations imposed by the compressor discharge temperature limit.

It should be noted that the use of the scroll compressor described in FIGS. 2A, 2B, and 2C requires a slight modification to refrigeration system 100 of FIG. 1. This system modification is described in FIG. 3 below.

FIGS. 2A, 2B, and 2C illustrate the two main components of a scroll compressor that is commonly used in refrigeration applications, in keeping with the invention. Scroll compressor 200 is a commercially available scroll compressor with liquid injection, such as a Copeland Glacier Refrigeration Scroll [for example, all ZF series] manufactured by Copeland Corporation (Sydney, Ohio).

Scroll compressor 200 includes a stationary spiral-shaped member (scroll) 210, shown in FIG. 2A, and a moving, or orbiting scroll 220, shown in FIG. 2B. Scroll 210 and scroll 220 are identical in shape. Scroll 220 is rotated 180 degrees and meshed with scroll 210 as shown in FIG. 2C above.

Figure 2:
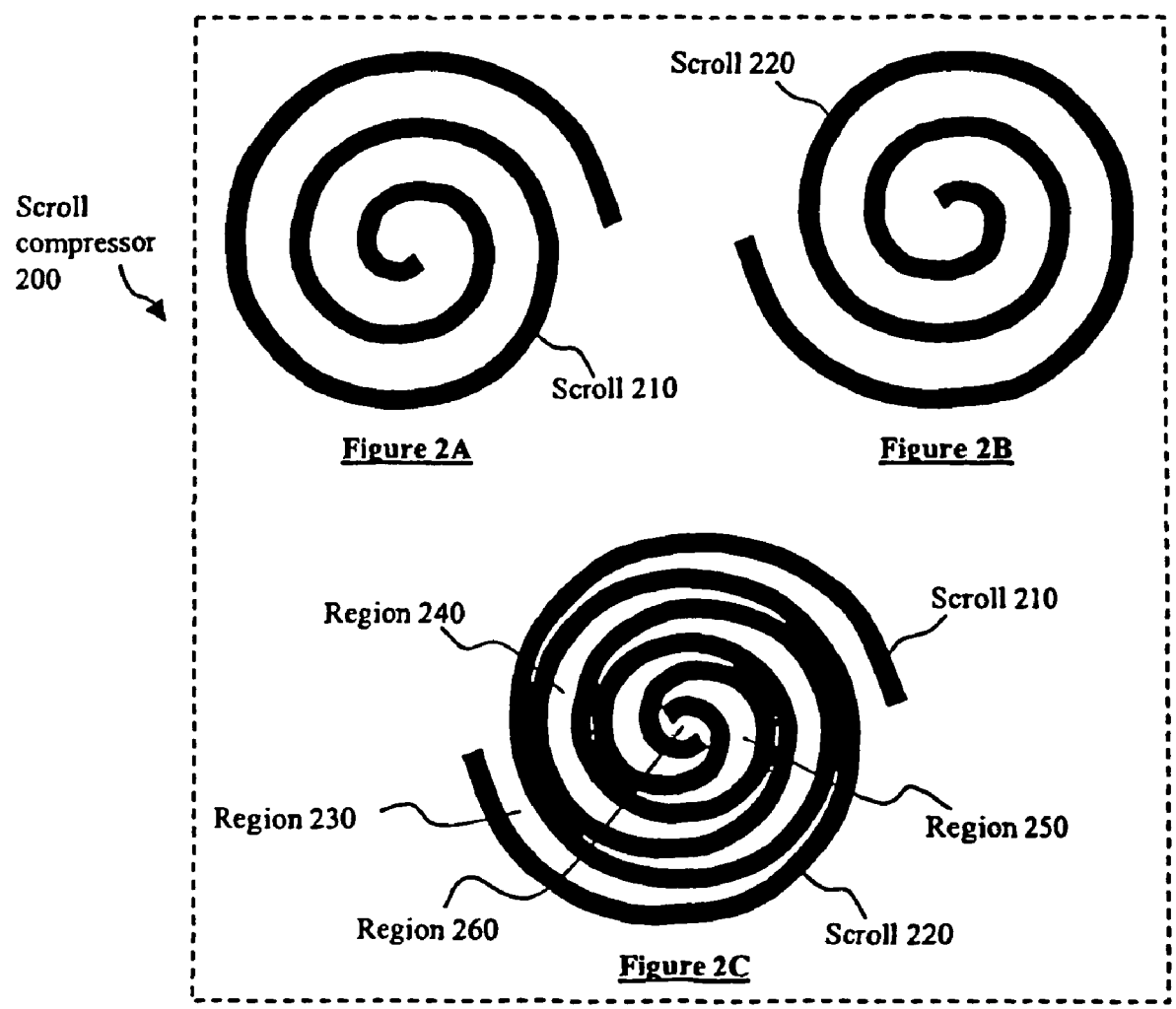
FIG. 2A depicts one of the two main components of a scroll compressor that is commonly used in refrigeration applications in accordance with the invention.
FIG. 2B depicts the second of the two main components of a scroll compressor that is commonly used in refrigeration applications in accordance with the invention.
FIG. 2C depicts the combined two main components of a scroll compressor that is commonly used in refrigeration applications in accordance with the invention.

Scrolls 210 and 220 of scroll compressor 200 fit together, forming crescent shaped gas pockets. More specifically, scroll compressor 200 further includes a region 230 that forms a low pressure pocket, a region 240 that forms a medium pressure pocket, and a region 250 that forms a high pressure pocket, and a region 260 that forms a center discharge pocket, as shown in FIG. 2. Regions 230, 240, and 250 each have a complimentary region (not labeled) to form a pair of low-pressure pockets, medium pressure pockets, and high-pressure pockets, respectively. These pockets shown are exemplary. However, since the scroll compressor is characterized by continuous motion, these pockets result from a "snap shot" of the scroll motion.

The basic operation of a compressor, i.e., taking low pressure, low temperature refrigerant gas and compressing it to high pressure, high temperature gas, is well known in the refrigeration industry. More specifically, the basic operation of scroll compressor 200 is also well known, however a brief description is provided below.

In operation, scroll 210 remains stationary, while scroll 220 orbits relative to scroll 210. As the spiral movement continues, low pressure gas enters at the periphery (regions 230) and is drawn in and forced toward the center of scroll compressor 200, creating increasingly higher gas pressures and discharging the gas from a region 260 port of fixed scroll 210. Several pockets of refrigerant gas are compressed simultaneously, creating greater pressures toward the center of scroll compressor 200 (regions 250 and 260) and providing a smooth, nearly continuous cycle throughout the scroll orbit.

During operation the gas volume reduces, meaning scroll compressor 200 has internal compression. For a given scroll pair the amount of compression depends on the discharge port size. Unlike a reciprocating compressor, scroll compressor 200 has definite limits on the degree of compression produced and this is related to the shape and size of scrolls 210 and 220.

The benefits of using of scroll compressor 200 as compressor 102 of very low temperature refrigeration system 100 of FIG. 1, as compared with using a conventional reciprocating compressor (i.e., screw or piston compressor), is that scroll compressor 200:

has a compact vertical design, resulting in reduced floor space requirements;
can be completely oil-free;
uses rotary motion that can be balanced for low vibration and very low noise;
can be configured to use no valves or other wearing parts;
can run at higher speeds, up to 10,000 rpm for example, without compromising quiet, efficient operation;
can be manufactured at a competitive cost;
has higher volumetric efficiency;
uses only two primary moving parts resulting in very high reliability; and
has a low rubbing velocity, resulting in low noise and low wear.

It should be noted that in practice, different versions of scroll compressors are possible. In many refrigeration processes, the compressor is oil lubricated and does emit oil in the discharge line. Further, refrigeration scroll compressors typically have a discharge valve, although the forces on this valve are considerably less than on a reciprocating compressor discharge valve.

Figure 3:
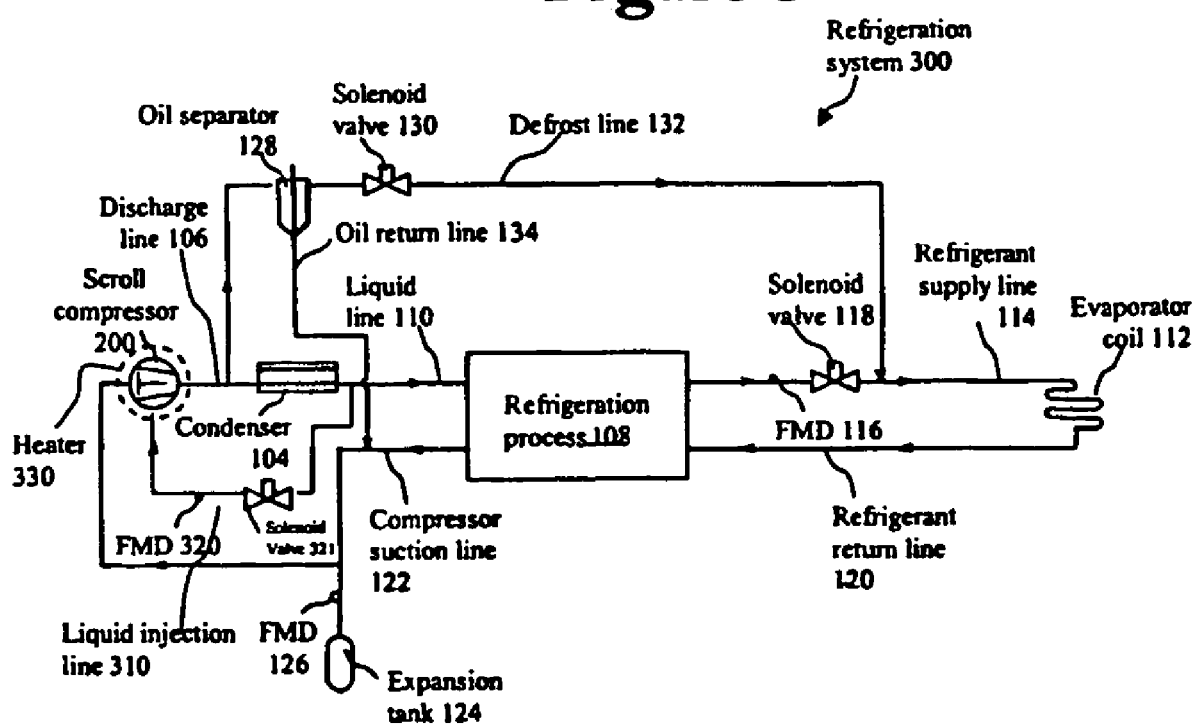
FIG. 3 depicts a second embodiment of a very low temperature refrigeration system in accordance with the invention.

As a first embodiment of the invention, FIG. 3 shows a very low temperature refrigeration system 300. Refrigeration system 300 is identical to very low temperature refrigeration system 100 of FIG. 1, except that compressor 102 is replaced with scroll compressor 200. Refrigeration system 300 further includes a liquid injection line 310 connected from liquid line 110 (output of condenser 104) and feeding back to scroll compressor 200 (i.e., scrolls 210 and 220 of scroll compressor 200). Inline with liquid injection line 310 between liquid line 110 and scroll compressor 200 are an FMD 320 and an optional solenoid valve 321 or other flow control device. FMD 320 is a conventional flow-metering device, such as a capillary tube, an orifice, a proportional valve with feedback, or any restrictive element that controls flow. However, for very-low temperature applications it has to be resized to provide optimum gas-vapor-liquid flow to the cooling area. In the case where FMD 320 is a proportional valve with feedback, the feedback loop will typically use the discharge temperature as the main source of feedback and the system is constrained either mechanically or through additional feedback loops to prevent formation of liquid in the scrolls after the injected liquid is mixed with the intermediate compressed gas.

The solenoid valve or other flow control device is required to prevent a flooded start of the compressor and its damage. The solenoid must be closed when the compressor is cycled off. Failure to provide the solenoid valve can result in liquid refrigerant completely filling the Scroll during an "off" cycle. If power is reapplied in this condition, the hydraulic effect produced could result in pressure high enough to cause permanent damage to the compressor. However, other means of preventing liquid flooding of the scrolls are possible. The essential element of the invention is the management of the compressor discharge temperature via liquid injection.

The necessity of liquid injection line 310 feeding back to scroll compressor 200 is due to the fact that the scroll compressor discharge temperature without injection in an very low temperature refrigeration system with mixed refrigerant containing low boiling refrigerants can reach from 180 to 200° C. However, the upper safe operating limit of scroll compressor 200 is typically only in the range of 125 to 135° C. (when measured at the service valve), thereby necessitating excessive cooling. That is, the limitation of discharge temperature results in the system designer adjusting the refrigerant mix so that the percentage of low boiling refrigerants is reduced. The reduction in low boiling refrigerants results in reduced system efficiency. Improved management of the discharge temperature via liquid injection results in improved system efficiency. Standard refrigeration systems make use of liquid injection for a similar purpose. However, in those prior art applications, the system limitations are different: They need only be concerned with flow rate and operating conditions. In the case of very low temperature refrigeration, the refrigerant mixture composition is a new dimension, and the management of liquid refrigerants is more difficult due to their warmer boiling points. Compared with prior art systems, the system efficiency can be improved by using liquid injection.

Furthermore, it is important to inject mostly liquid refrigerant, as liquid will cool scroll compressor 200 more efficiently than vapor refrigerant. When using liquid injection, the amount of liquid injected must be limited to assure that liquid will not be present in the scrolls after mixing the injected liquid with the partially compressed gas.

The need for liquid injection for very low temperature mixed refrigerant systems is more important than for conventional refrigeration cycles that use scroll compressors.

This is in contrast to conventional refrigeration systems that utilize a single refrigerant, or a mixture of refrigerants with relatively closely spaced boiling points such as R-410A or R-404A. Due to the wide spacing of the very low temperature mixed refrigerant systems and the relatively warm boiling point of the warmest boiling components used, refrigerant component separation can occur. This is because very low temperature mixed refrigerant systems typically employ refrigerants with normal boiling points of −15° C. or warmer. When used on an oil lubricated scroll compressor the warmer boiling refrigerants tend to collect in the compressor oil sump. The vertical design of the scroll, and the direct access of returning suction refrigerant to the compressor sump contribute to this separation effect in which warmer boiling refrigerants accumulate in the compressor oil. Even when additional warm boiling refrigerants are added to compensate for this separation excessive discharge temperature conditions persist when the compressor is in operation. This does not affect conventional refrigeration systems in the same way since their circulating fluid composition remains substantially unchanged. The effect on a very low temperature mixed refrigerant system is to remove these warm boiling refrigerants from circulation. This has the affect of increasing compressor discharge temperature and reducing refrigeration efficiency.

Therefore, liquid injection along with the especially composed mixed refrigerant enables use of the vertical scroll compressor for very low temperature mixed refrigeration systems and makes possible improved refrigeration efficiency than would be possible without liquid injection.

It is possible to apply scroll compressors without liquid injection to very low temperature refrigeration systems as has been demonstrated in the prior art with systems. However, the lack of liquid injection limits the range of refrigerant compositions that can be used while assuring good compressor reliability. This affects the maximum composition of very low temperature boiling components such as argon, nitrogen and R-14, or limits the compressor suction or discharge pressure and the associated compression ratio and causes reduced system efficiency.

Alternatively, the fraction of warm boiling refrigerants can be limited which causes a reduction in the quantity of heat that can be rejected by the system. This causes a reduction in the quantity of heat that can be removed at very low temperatures, and limits the pressures at which the compressor can operated. Therefore, the use of liquid injection enables use of vertical scroll compressors in very low temperature mixed refrigerant systems and supports higher performance levels of the refrigeration system than can be achieved without liquid injection.

To insure that mostly liquid refrigerant is returned to the liquid line of the scroll compressor 200, the physical connection of liquid injection line 310 into liquid line 110 is critical. Since the refrigerant present in liquid line 110 of an auto-cascade refrigeration system is a mixture of vapor and/or gas and liquid, liquid injection line 310 must "T" into the bottom of a horizontal section of liquid line 110. In addition, a liquid accumulating tank may be installed between "T" and a solenoid valve to assure a large liquid content of the injection flow. This is because the liquid and vapor refrigerant, although flowing together in liquid line 110, are not forming a completely homogeneous flow. Due to gravity, liquid may be collected at the bottom of the tank that serves as a liquid accumulator. As a result, refrigerant with a very large liquid content is returned to scroll compressor 200 via liquid injection line 310.

In operation, FMD 320 allows a small portion of the liquid refrigerant flow to return to scroll compressor 200. The liquid is injected at intermediate pressure to the compression chamber. This method provides a self-regulating system that allows for an increase/decrease of suction pressure and, therefore, provides a change in suction mass flow rate and system performance. FMD 320 also acts to reduce the pressure of the liquid refrigerant returned to scroll compressor 200, thereby insuring the positive injection flow for both methods. Injecting liquid refrigerant from liquid line 110 into scroll compressor 200 provides cooling to scrolls 210 and 220, thereby reducing their temperature to within safe operation limits.

There is no liquid circulation through the scroll members. A small amount of liquid refrigerant evaporates quickly if it reaches the compression chamber and mixes with a main hot stream. Cooling effect is mainly due to "cold" vapor convection and evaporative heat removal in the injection passage. This is especially true in the case of injection of liquid at an intermediate pressure since the gas is already partially warmed by the compression process to this point.

At ambient temperature conditions, some mixed refrigerants may have higher heats of vaporization, and warmer normal boiling points compared to conventional refrigerants such as R22, R134a or R404a. A larger heater input wattage will be required to prevent excessive refrigerant condensation and liquid formation in the oil sump when the compressor is off.

The types of oil to be used are important for the successful application of any compressor system. In particular, POE oils have been more difficult to apply successfully in various compressor designs, including scroll compressors compared to previous oils used such as alkyl benzene and mineral oils. Some oils that have been found to be useful with liquid injection scroll compressors are CPI Engineering (Midland, Mich.) BVA Solest LT 32 (about 32 centistokes at 40° C.), BVA Solest 46 for example (about 46 centistokes at 40° C.), BVA Solest 68 for example (about 68 centistokes at 40° C.), and BVA Solest 120 for example (about 120 centistokes at 40° C.). Others in this product family, and other POE oils from other vendors of similar viscosity grade are also expected to be useful.

An example of an alkyl benzene oil that can be used with scroll compressors is Shrieve Chemical (Texas) Zerol 150 (about 28 centistokes at 40° C.). It is also expected that Zerol 300 (about 56 centistokes at 40° C.) will be useful. Likewise, other alkyl benzene oils of similar viscosity grades, and even some of lower viscosity, especially when used with POE oil are expected to be useful. The two conflicting requirements for a very low temperature refrigeration system are that the compressor oil must lubricate the moving compressor components such that no significant wear occurs, and the oil must be compatible with the refrigerants used such that it remains in a liquid state wherever it is circulating. In general, selecting an oil with a higher viscosity reduces the likelihood of compressor wear but increases the likelihood of the oil separating from the refrigerant at low temperature and clogging tubing, expansion devices, or control valves.

Those skilled in the art will recognize the need for proper reliability assessments for the use of a particular oil-compressor-refrigerant combination. Likewise, those skilled in the art will understand the need for proper refrigeration system reliability assessments as it relates to the management of oil within the system.

Many possible combinations of refrigerants and compressor oils are possible for the disclosed invention. Examples of such refrigerants are found in prior art systems commercially available such as in IGC Polycold's (Petaluma, Calif.) PFC-550 HC, PFC-552 HC, PFC-551 HC. In addition, specific refrigeration mixtures and their limitations are disclosed in U.S. Pat. No. 6,502,410 and U.S. Pat. No. 6,481,223, the disclosures of which are incorporated herein by reference.

In experiments using a Copeland Refrigeration scroll, model ZF48K4E-TWD-551, good reliability was experienced using Solest LT 32 in combination with R-236fa, R-125, R-23, R-14 and Argon. However, substituting R-245fa in place of R-236fa led to compressor failure thus indicating the need for a higher viscosity of oil for this particular mixture. It is expected though that some combinations with lower concentrations of R-245fa with LT32 will be successful and useful. As a test of a higher viscosity grade, Solest 68 was used with a mixture containing R-245fa.

Still other possible oil-refrigerant combinations are possible. For example, alkyl benzene oils can be used with HCFC free refrigerant mixtures. In this case, the system designer must be more careful with oil management to prevent excess oil in the low temperature stages of the refrigeration system. Also, alkyl benzene oils can be used with HCFC refrigerant mixtures. Likewise, POE oils can be used with HCFC refrigerants, however, HCFC's tend to have a higher affinity for POE oil and typically result in more oil thinning than do HFC's.

The specific refrigerant mixture to be employed in a system is again a matter of choice to those skilled in the art. Some of the factors to be considered are: Material compatibility with other system components, solubility and miscibility with compressor oil, freezeout at low temperature, system efficiency, environmental regulations, toxicity, flammability, etc. Those skilled in the art will understand the importance of these tradeoffs. As it relates to this invention, the interaction of the warmer boiling refrigerants in the mixture with the oil is typically quite critical. Typically it is desired that this refrigerant have a warm boiling point (−15 to +40° C.), around room temperature to improve overall system efficiency, by providing a high rate of ambient heat rejection. However, a warm boiling refrigerant will tend to thin out the compressor oil and degrade the lubrication provided by the compressor oil.

Based on testing of specific refrigerant blends (on an as charged weight percent) the following range of compositions is expected to be useful with liquid injection:
R-236fa 20 to 45%
R-125 8 to 15%
R-23 12 to 30%
R-14 18 to 34%
Argon 6 to 15%

The testing of mixtures was performed with a Copeland ZF40K4E-TWD compressor used on a modified model Polycold PFC-662 system in which the scroll compressor with liquid injection was used to replace a semi-hermetic reciprocating compressor. The temperatures produced by this system ranged, depending on external load and refrigerant mixture, from −106° C. to −160° C. The results obtained indicate that the use of liquid injection made it possible for these systems to operate whereas these same mixtures were not able to operate without liquid injection due to excessive discharge temperatures that resulted in opening of the compressor thermal overloads. These results reinforce the distinction between the systems disclosed herein and the prior art. Management of the circulation of the warm boiling refrigerant enable these blends to be adjusted to achieve improved overall system efficiency.

Still other refrigerant combinations are possible depending on the specific temperature for which the refrigeration system is optimized.

As an example, HCFC containing blends that can be expected to be useful are blends comprised of R-123, R-124, R-125, R-218, R-23 and/or ethane, R-14, and argon as described in U.S. Pat. No. 6,481,223.

As another example, HCFC-free blends that can be expected to be useful are blends comprised of R-4112, R-245fa, R-236fa, E-347, R-134a, R-125, R-218, R-23 and/or ethane, R-14, argon, nitrogen, neon, helium as described in U.S. Pat. No. 6,502,410. In addition, other compounds such as methane, oxygen, hydrogen, xenon and krypton could be included as well.

The embodiments disclosed herein will be useful for very low temperature mixed refrigerant systems in which the refrigerant mixture used is comprised of at least 20% of a warm boiling refrigerant and 15% of a low boiling refrigerant. The various combinations of individual refrigerants, and their composition is nearly infinite. In general, the benefit of these embodiments will be greater as the amount of warm boiling refrigerant and/or low boiling refrigerant is increased, and as the boiling point of low boiling refrigerants is lowered, and as the boiling point of the warm boiling refrigerant is increased.

An optional heater 330 is mechanically attached to the oil sump of scroll compressor 200. Heater 330 is a conventional crankcase or band heater, for example, manufactured by Omega Engineering Co. The heater is turned on during an "off" cycle to prevent liquid refrigerant accumulation in the oil sump. If power is reapplied in the "flooded" condition, the hydraulic effect produced can result in pressure high enough to cause permanent damage to the compressor.

The result is that the very low temperature refrigeration system of the present invention, using a commercially manufactured scroll compressor having liquid injection for lowering the discharge temperature and a heater for oil sump warming, is optimized for efficient operation. It is of a more compact size as compared with refrigeration systems using conventional reciprocating compressors, and is suitable for use with mixed refrigerant (MR) blends having warm and low boiling components.

In one preferred embodiment, the boiling points of the warm boiling refrigerants are limited to the range of −15 C to +45 C.

In another embodiment of the system, gas injection, or a mixture of gas and liquid injection, is used to cool the compressor at an intermediate pressure. This is expected to be less effective than liquid injection since the effective removal of heat due to liquid evaporation is lost or reduced.

In another embodiment of the system, liquid injection cooling of the compressor is used with a mixture of gasses comprised of at least one medium boiling refrigerant and one low boiling refrigerant.

In yet another embodiment of the system, optional heater 330 is powered during compressor operation. The heater can be used in an alternative arrangement in which it is used to control the amount of liquid refrigerant that is diluted in the compressor oil. In most cases, the use of liquid injection will inherently limit the amount of liquid that is mixed with the compressor oil. However, use of an external heater, although typically undesirable, may be of benefit in some applications. Normally, the addition of heat during compressor operation will tend to increase the compressor discharge temperature. However, it is anticipated that some combinations of refrigerant composition and compressor may benefit by this arrangement since the addition of heat to the sump will prevent accumulation of liquid refrigerant in the compressor sump and thus reduce the discharge temperature due to the reduced ratio of specific heats of the circulating mixture.

Since a multitude of possible refrigerant compositions, and available temperatures exist on a very low temperature mixed refrigerant system, it is expected that there will be several useful variations of the first embodiment.

The invention claimed is:

1. A very low temperature refrigeration system wherein:
   a) a compressor of the refrigeration system is a scroll compressor;

b) a refrigerant used in the refrigeration system is a multi-component refrigerant wherein components of the refrigerant have boiling points which are separated by at least 50° C.;
c) the refrigerant contains a high content of low boiling refrigerant; and
d) a portion of the refrigerant is injected into the scroll compressor compression chamber at intermediate pressure from a liquid line of the refrigeration system.

2. The refrigeration system of claim 1 also comprising a heater mechanically attached to an oil sump of the scroll compressor.

3. The refrigeration system of claim 1 where the injected refrigerant is gaseous or a mixture of gaseous and liquid refrigerant.

4. The refrigeration system of claim 1 where the injected refrigerant is liquid refrigerant.

5. The refrigeration system of claim 4 where there is no liquid circulation through the scroll members of the scroll compressor.

6. The refrigeration system of claim 4 where the liquid refrigerant that is injected into the scroll compressor is drawn from the bottom of a horizontal section of liquid line from the condenser of a very low temperature mixed refrigerant system.

7. The refrigeration system of claim 6 further comprising a flow control means in the line that returns the liquid refrigerant to the scroll compressor.

8. The refrigeration system of claim 7 further comprising a liquid accumulating tank installed in the liquid refrigerant return to the scroll compressor between the connection to the liquid line and the flow control means.

9. The refrigeration system of claim 4 where the multi-component refrigerant contains at least one low boiling, at least one medium boiling and at least one warm boiling refrigerant.

10. The refrigeration system of claim 9 where the multi-component refrigerant contains two or more of each of low boiling, medium boiling and warm boiling refrigerants.

11. The refrigeration system of claim 9 where the multi-component refrigerant contains in excess of fifty percent of low boiling refrigerants.

12. The refrigeration system of claim 9 where the multi-component refrigerant contains between about twenty and about forty five percent of low boiling refrigerants.

13. The refrigeration system of claim 9 where the multi-component refrigerant contains at least fifteen percent of low boiling refrigerants.

14. The refrigeration system of claim 4 where the refrigerant is a blend comprised of R-123, R-124, R-125, R-218, R-23 and/or ethane, and R-14.

15. The refrigeration system of claim 4 where the refrigerant is a blend comprised of R-236fa, R-125, R-23, R-14, and argon.

16. The refrigeration system of claim 15 where the refrigerant is a blend comprised of
20 to 45% of R-236fa;
8 to 15% of R-125:
12 to 30% of R-23;
18 to 34% of R-14; and
6 to 15% of Argon.

17. A method of reducing the temperature of multi-component refrigerant exiting a scroll compressor in a very low temperature refrigeration system the method comprising:
compressing the multi-component refrigerant in the scroll compressor, wherein components of the refrigerant have boiling points that are separated by at least 50° C., and wherein the refrigerant contains a high content of low boiling refrigerant; and
injecting a quantity of multi-component refrigerant at intermediate pressure from a liquid line into the compressor's compression chamber.

18. The method of claim 17, wherein the multi-component refrigerant contains in excess of fifty percent of low boiling refrigerants.

19. The method of claim 17, wherein the multi-component refrigerant contains between about twenty and about forty five percent of low boiling refrigerants.

20. The method of claim 17, wherein the multi-component refrigerant contains at least fifteen percent of low boiling refrigerants.

21. A method of reducing the temperature of multi-component refrigerant exiting a scroll compressor in a very low temperature refrigeration system, the method comprising:
compressing the multi-component refrigerant in the scroll compressor, wherein components of the refrigerant have boiling points that are separated by at least 50° C., and wherein the refrigerant contains a high content of low boiling refrigerant; and
injecting a quantity of multi-component refrigerant at intermediate pressure into the compressor's compression chamber.

\* \* \* \* \*